(12) United States Patent
Kippel et al.

(10) Patent No.: US 11,668,239 B2
(45) Date of Patent: Jun. 6, 2023

(54) SYSTEM AND METHOD FOR CONTROLLING TEMPERATURE IN AN AIR INTAKE

(71) Applicant: General Electric Company, Schenectady, NY (US)

(72) Inventors: Bradly Aaron Kippel, Greenville, SC (US); Scott Arthur Day, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/911,263

(22) Filed: Jun. 24, 2020

(65) Prior Publication Data
US 2021/0404382 A1    Dec. 30, 2021

(51) Int. Cl.
*F02C 7/08* (2006.01)
*F02C 7/057* (2006.01)
*F02C 9/18* (2006.01)

(52) U.S. Cl.
CPC ............... *F02C 7/08* (2013.01); *F02C 7/057* (2013.01); *F02C 9/18* (2013.01)

(58) Field of Classification Search
CPC .... F02C 7/08; F02C 7/10; F02C 7/143; F02C 7/1435
See application file for complete search history.

(56) References Cited

U.S. PATENT DOCUMENTS

| | | | |
|---|---|---|---|
| 4,951,460 A * | 8/1990 | Prochaska | F02C 7/04 60/791 |
| 5,463,873 A * | 11/1995 | Early | F28D 5/00 62/121 |
| 6,250,064 B1 | 6/2001 | Tomlinson et al. | |
| 6,260,350 B1 | 7/2001 | Horii et al. | |
| 6,442,942 B1 | 9/2002 | Kopko | |
| 6,478,289 B1 | 11/2002 | Trewin | |
| 6,581,368 B2 | 6/2003 | Utamura | |
| 6,634,165 B2 | 10/2003 | Tomlinson et al. | |
| 7,028,485 B1 | 4/2006 | Mee | |
| 7,310,950 B2 | 12/2007 | Dovali-Solis et al. | |
| 8,566,001 B2 | 10/2013 | Stuttaford et al. | |
| 9,850,816 B2 | 12/2017 | Zhang et al. | |

(Continued)

FOREIGN PATENT DOCUMENTS

| | | |
|---|---|---|
| CN | 201236746 Y | 5/2009 |
| EP | 2642092 A1 | 9/2013 |

(Continued)

OTHER PUBLICATIONS

European Extended Search Report for EP Application No. 21180358.0 dated Nov. 15, 2021; 8 pgs.

*Primary Examiner* — Gerald L Sung
(74) *Attorney, Agent, or Firm* — Fletcher Yoder, PC

(57) ABSTRACT

A system includes a temperature control system configured to couple to an air intake section of a gas turbine system. The temperature control system includes a variable heating system having one or more heaters configured to heat an airflow in the air intake section when the airflow is cooled by an evaporative cooling system. The temperature control system is configured to control the variable heating system to vary an amount of heat supplied by the one or more heaters based on at least one temperature measurement relative to a temperature threshold.

18 Claims, 4 Drawing Sheets

(56) References Cited

U.S. PATENT DOCUMENTS

| | | | |
|---|---|---|---|
| 10,480,792 B2 | 11/2019 | Slobodyanskiy et al. | |
| 2003/0019214 A1* | 1/2003 | Shibata | F02C 6/18 60/775 |
| 2006/0130454 A1* | 6/2006 | Liang | F02C 7/08 60/39.01 |
| 2007/0240400 A1* | 10/2007 | Smith | F02C 7/08 60/39.182 |
| 2011/0173947 A1* | 7/2011 | Zhang | F02C 7/185 60/39.83 |
| 2013/0199196 A1* | 8/2013 | Chillar | F01K 23/10 60/773 |
| 2014/0060774 A1* | 3/2014 | Motakef | F02C 7/047 165/48.1 |
| 2014/0093351 A1* | 4/2014 | Motakef | F02C 7/057 415/1 |
| 2014/0123620 A1 | 5/2014 | Huntington et al. | |
| 2014/0321967 A1 | 10/2014 | Zhang et al. | |
| 2015/0121881 A1 | 5/2015 | Zhang et al. | |
| 2016/0258629 A1 | 9/2016 | Slobodyanskiy et al. | |
| 2016/0348690 A1 | 12/2016 | Larson et al. | |
| 2017/0322116 A1 | 11/2017 | Escobedo Hernandez | |
| 2019/0353102 A1 | 11/2019 | Choi | |

FOREIGN PATENT DOCUMENTS

| | | |
|---|---|---|
| EP | 3265724 A1 | 1/2018 |
| WO | 0100975 A1 | 1/2001 |
| WO | 2012166288 A1 | 12/2012 |
| WO | 2015121146 A1 | 8/2015 |
| WO | 2016141286 A1 | 9/2016 |

\* cited by examiner

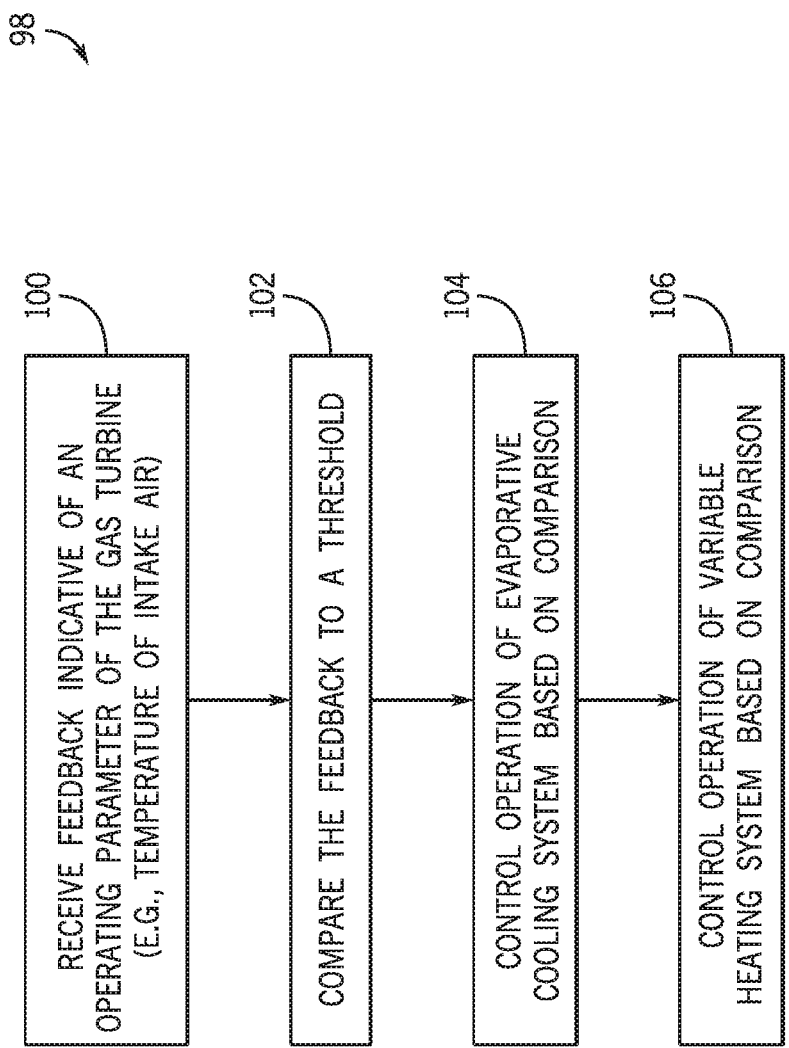

SYSTEM AND METHOD FOR CONTROLLING TEMPERATURE IN AN AIR INTAKE

BACKGROUND

The subject matter disclosed herein relates to gas turbines and, more particularly, to systems and methods for varying a temperature of air received by an air intake of a gas turbine.

A gas turbine, or gas turbine engine, may include an air intake section, a compressor section, a combustion section, a turbine section, and an exhaust section. In operation, the air intake section receives an intake air from the ambient environment, and the compressor section compresses the intake air. The compressed air flows to the combustion section, which uses the compressed air for combustion of one or more fuels to generate a hot combustion gas. The hot combustion gas drives rotation of the turbine section, which in turn drives the compressor section and one or more loads, such as a generator.

The temperature of air received by the compressor section from the intake section affects the compression of the air and the power output by the gas turbine. For example, a lower temperature of the intake air enables the compressor section to supply the combustion section with a greater mass flow of compressed air at a lower temperature, thereby increasing the power output by the gas turbine. However, if the gas turbine produces too much power as a result of the temperature of the intake air being too low, then adjustments (e.g., partial closure of inlet guide vanes) may be made to reduce the power output of the gas turbine. A higher temperature of the intake air causes the compressor section to supply the combustion section with a lesser mass flow of compressed air at a higher temperature, thereby decreasing the power output by the gas turbine.

A need exists for controlling the temperature of the air intake to control the mass flow of the compressed air and the power output of the gas turbine.

BRIEF DESCRIPTION

Certain embodiments commensurate in scope with the originally filed claims are summarized below. These embodiments are not intended to limit the scope of the present technology, but rather these embodiments are intended only to provide a brief summary of possible forms of the technology. Indeed, the present system and method may encompass a variety of forms that may be similar to or different from the embodiments set forth below.

In certain embodiments, a system includes a temperature control system configured to couple to an air intake section of a gas turbine system. The temperature control system includes a variable heating system having one or more heaters configured to heat an airflow in the air intake section when the airflow is cooled by an evaporative cooling system. The temperature control system is configured to control the variable heating system to vary an amount of heat supplied by the one or more heaters based on at least one temperature measurement relative to a temperature threshold.

In certain embodiments, a method includes controlling a temperature control system to adjust a temperature of an airflow in an air intake section of a gas turbine system. The method includes controlling an evaporative cooling system to cool the airflow in the air intake section. The method also includes controlling a variable heating system having one or more heaters to heat the airflow in the air intake section, wherein controlling the variable heating system includes varying an amount of heat supplied by the one or more heaters based on at least one temperature measurement relative to a temperature threshold.

In a certain embodiments, a system includes a temperature control system configured to couple to an air intake section of a gas turbine system. The temperature control system includes an evaporative cooling system configured to cool an airflow in the air intake section. The temperature control system also includes a variable heating system having one or more heaters configured to heat the airflow in the air intake section. Further, the temperature control system includes a controller configured to control the variable heating system to vary an amount of heat supplied by the one or more heaters based on at least one temperature measurement relative to a temperature threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flow chart of an embodiment of a process for controlling the temperature in an intake section of the gas turbine system using the temperature control system of FIGS. 1-3.

DETAILED DESCRIPTION

Figure 1:
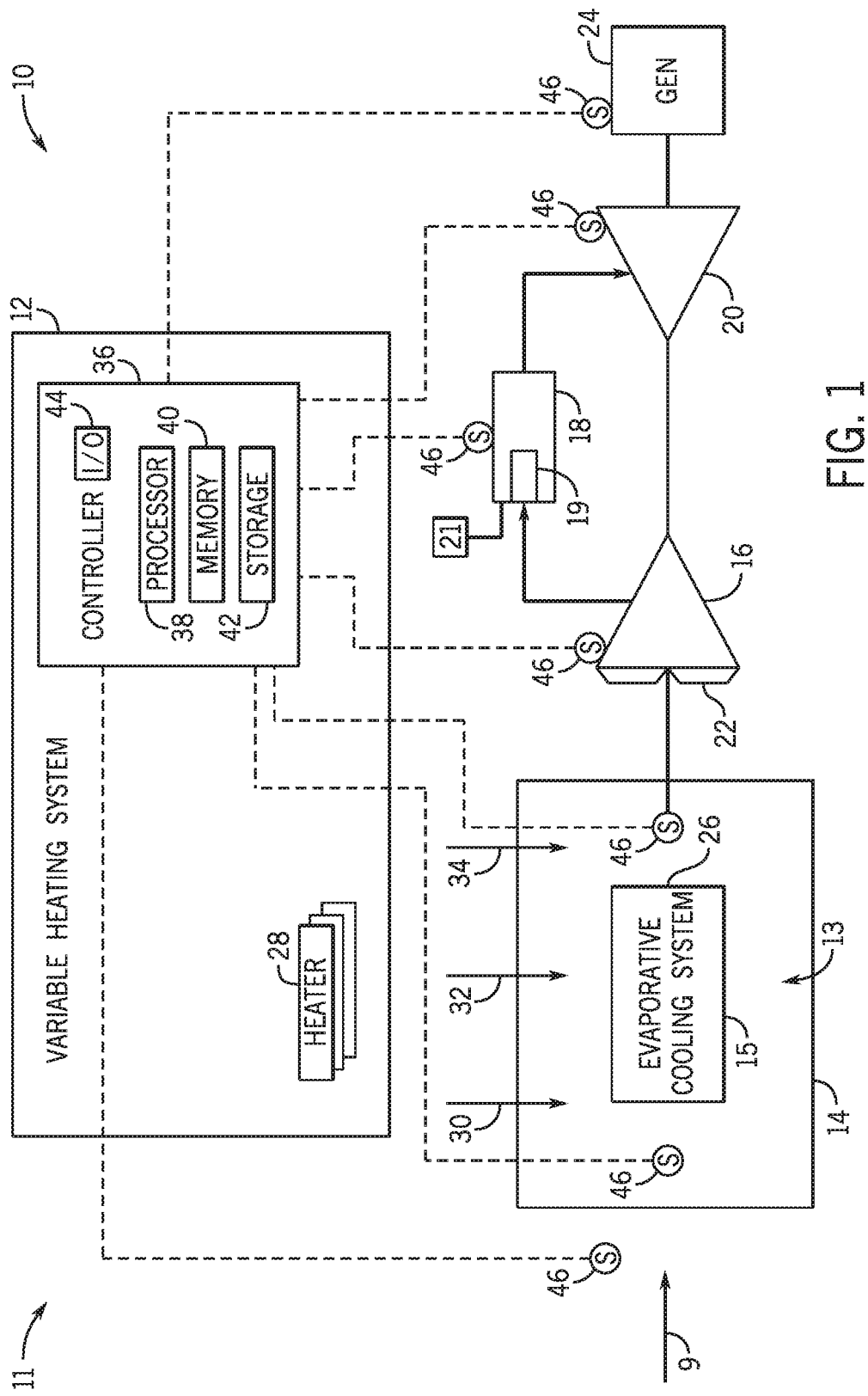
FIG. 1 is a block diagram of an embodiment of a gas turbine system having a temperature control system with an evaporative cooling system and a variable heating system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present invention, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

In the present context, the term "about" or "approximately" is intended to mean that the values indicated are not exact and that the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As discussed in detail below, the disclosed embodiments include a temperature control system in an air intake section upstream of a compressor section of a gas turbine, wherein the temperature control system includes a cooling system (e.g., an evaporative cooling system) and a variable heating system (e.g., one or more heaters). The variable heating system is configured to adjust the temperature while enabling continuous operation of the evaporative cooling system. The evaporative cooling system lowers a temperature of the intake air upstream of the compressor section, thereby helping to increase efficiency of the compressor section. In particular, the evaporative cooling system may be configured to lower a temperature of the intake air to enable the compressor section to supply a combustion section with a greater mass flow of compressed air at a lower temperature, thereby increasing the power output by the gas turbine.

If the temperature of the intake air falls to a temperature at or below one or more lower temperature thresholds, then the temperature control system may selectively enable the variable heating system to offset the cooling effects by raising the temperature of the intake air to a temperature above the one or more temperature thresholds. The lower temperature thresholds may include anti-icing temperature thresholds. The anti-icing temperature threshold may be a lower temperature limit to help inhibit ice formation, e.g., a temperature at least above a freezing temperature. In some embodiments, the temperature thresholds may be selected to achieve a power output by the gas turbine at certain level without having to at least partially close the inlet guide vanes (IGVs) of the compressor. In some embodiments, the temperature thresholds may be selected to reduce an emissions level below a threshold.

An evaporative cooling system may be configured to cool the intake air by mixing the intake air with an evaporated liquid (e.g., water vapor) from an evaporative cooling media that includes an absorbed cooling liquid (e.g., water). However, the operational state of the evaporative cooling system may be either fully wet when in use or fully dry when not in use. That is, in certain embodiments, the evaporative cooling system may not have a "part-load" operating point. Without the disclosed embodiments, the evaporative cooling system may overcool the intake air.

There are many cases where the gas turbine is output limited, and any additional power above this output limit cannot be accepted to the power grid. In such cases, the gas turbine operator will normally need to shut down the evaporative cooling system and/or at least partially close inlet guide vanes (IGVs) of the compressor section. Shutting down the evaporative cooler may result in the unit producing less power output than dispatched for, so this action is not always a workable option. Although closing the IGVs allows the gas turbine operator to modulate the unit output to not exceed the output limit, closing the IGVs negatively and significantly impacts the efficiency of the gas turbine and results in more fuel consumption. The disclosed embodiments are intended to address these drawbacks of the conventional evaporative cooling system.

Accordingly, the disclosed embodiments supplement the evaporative cooling system with a variable heating system that enables granular control of the temperature of the air received by the air intake section to achieve a desired power output. In general, the variable heating system includes a variable heating controller and one or more variable heaters (e.g., electric heaters, heat exchangers, etc.) that may be disposed within the air intake section, such as proximate to an evaporative cooling system (e.g., upstream, downstream, or in a generally overlapping axial position relative to the evaporative cooling system). In some instances, the variable heating system may be retrofitted into an existing air intake section that includes an evaporative cooling system.

In general operation, the variable heating controller is configured to generate control signals based on feedback indicative of conditions of the gas turbine and/or ambient air to cause the one or more heaters to heat the received air. In some embodiments, the variable heating controller may receive feedback from one or more sensors (e.g., temperature sensors, humidity sensors, pressure sensors, and the like) that is indicative of a condition (e.g., temperature, humidity, pressure, and the like) of the ambient air or the air within the various components of the gas turbine (e.g., the air within the compressor prior to compression, the air flowing to the combustion section after compression, the temperature of the exhaust gas, and the like, as discussed more herein). In some embodiments, the feedback may include operating conditions of the gas turbine, such as a current power output by the gas turbine, a position of the inlet guide vanes (IGVs), and the like. Furthermore, the controller may use the feedback to modify operation of the one or more heaters when an operating parameter of the gas turbine deviates from a threshold, such as a desired power output of the gas turbine. In this way, the variable heating system may at least partially automate control of the temperature of the air received by the gas turbine to achieve a desired power output and efficiency.

FIG. 1 is a diagram of an embodiment of a gas turbine system 10 having a temperature control system 11 configured to control the temperature of a flow of intake air 9 (e.g., airflow) into the gas turbine system 10. In particular, the temperature control system 11 includes a variable heating system 12 and a cooling system 13 (e.g., an evaporative cooling system 26) disposed along an air intake section 14 (e.g., air intake duct) and configured to provide a desired temperature of the intake air 9. In certain embodiments, the variable heating system 12 is configured to provide a variable amount of heat to the intake air, while the cooling system 13 (e.g., evaporative cooling system 26) operates continuously in a fully operational mode. In other words, the evaporative cooling system 26 may be simply operating in an "on" configuration, while the variable heating system 12 is used to adjust the temperature of the intake air based on one or more temperature thresholds.

As discussed in further detail below, the variable heating system 12 may be integrated with and/or separate from the cooling system 13, 26. For example, the variable heating system 12 may be at least partially or entirely contained in the cooling system 13, 26 (e.g., within a common enclosure 15), or upstream of the cooling system 13, 26, and/or downstream from the cooling system 13, 26. Furthermore, the variable heating system 12 and/or the cooling system 13, 26 may be at least partially or entirely within the air intake section 14 (e.g., air intake duct).

In the illustrated embodiment, the gas turbine system 10 includes the air intake section 14 having the temperature control system 11, a compressor section 16, a combustion section 18, and a turbine 20. The compressor section 16 may include a plurality of inlet guide vanes (IGVs) 22 arranged downstream of the air intake section 14. At least in some instances, such as in land-based gas turbines, the turbine 20 may drive a generator 24. The air intake section 14 includes the cooling system 13 (e.g., evaporative cooling system 26) to cool the air received by the air intake section 14, as discussed in more detail with regards to FIG. 2.

The air intake section 14 also includes one or more heaters 28 of the variable heating system 12. The one or more heaters 28 may be disposed in various positions within the air intake section 14, such as in series and/or in parallel relative to a flow direction through the air intake section 14. For example, the one or more heaters 28 may be disposed at a first axial position 30, which is upstream the evaporative cooling system 26, at a second axial position 32 that at least partially overlaps with an axial position of the evaporative cooling system 26, and/or at a third axial position 34 that is downstream of the evaporative cooling system 26. As discussed in further detail with respect to FIG. 3, the approximate axial position of the one or more heaters 28 relative to the evaporative cooling system 26 may provide certain advantages, such as reducing a likelihood of icing of the IGVs 22 and reducing an amount of a cooling fluid from the evaporative cooling system 26 that is consumed by the air received by the air intake section 14.

In operation, the air intake section 14 receives air (e.g., intake air 9) from the ambient environment. While the air flows through the air intake section 14, the evaporative cooling system 26 may cool the air, and/or the one or more heaters 28 may heat the air. The cooled and/or heated air then flows through a plurality of IGVs 22 disposed at an inlet of the compressor section 16. In general, a position of the plurality of IGVs 22 may control an amount of the air flowing into the compressor section 16 and thus control a power output by the gas turbine 10. The compressor section 16 includes one or more compressor stages (e.g., 1 to 30 compressor stages), which progressively compress the air upstream of the combustion section 18.

The combustion section 18 combusts a fuel with the compressed air from the compressor section 16 to generate hot combustion gases (or exhaust gas). The combustion section 18 may include one or more combustors, such as an annular combustor or a plurality of combustor cans disposed circumferentially about an axis of the gas turbine 10. Each combustor of the combustion section 18 includes one or more fuel nozzles 19, which inject the fuel into a combustion chamber for combustion. The hot combustion gases (or exhaust gas) flow through and drive rotation of the turbine section 20. For example, the hot combustion gases may drive rotation of one or more turbine stages (e.g., 1 to 5 turbine stages) of the turbine section 20. The rotating turbine section 20 in turn drives rotation of one or more loads, such as the compressor section 16 and an external load such as a generator 24 via a common shaft.

In certain embodiments, the operation of the temperature control system 11 (e.g., variable heating system 12 and cooling system 13, 26) and/or the gas turbine system 10 may at least be partially controlled by a controller 36 having a processor 38, which may execute instructions stored in memory 40 and/or storage media 42, or based on inputs provided from a user via the input/output (I/O) device 44. The memory 40 and/or the storage media 42 may be read-only memory (ROM), random-access memory (RAM), flash memory, an optical storage medium, or a hard disk drive, to name but a few examples. For example, in operation, the processor 38 may send suitable control signals to actuate valves of a fuel supply system 21 to adjust a fuel supply to the fuel nozzles 19 of the combustion section 18. By further example, the processor 38 may send suitable control signals that control operation of the temperature control system 11, such as the cooling system 13, 26 and the variable heating system 12 (e.g., one or more heaters 28), to adjust a temperature of the intake air 9. As another example, the processor 38 may send suitable control signals that control operation of the IGVs 22, such as opening or closing the IGVs 22 based on operation of the gas turbine 10 and the temperature control system 11.

In certain embodiments, the controller 36 may function to regulate operation of the one or more heaters 28, the evaporative cooling system 26, and/or the IGVs 22 based on feedback from an operator (e.g., via the I/O devices 44) and/or from sensors 46 coupled to the intake section 14, the compressor section 16, the combustion section 18, the turbine section 20, and/or the generator 24. For example, the sensors 46 may include temperature sensors, pressure sensors, humidity sensors, exhaust emissions sensors, vibration sensors, clearance sensors, flame sensors, or any combination thereof. By further example, the sensors 46 in the intake section 14 and/or the compressor section 16 may monitor the temperature, pressure, and humidity of the airflow 9. The sensors 46 in the combustion section 18 may monitor the temperature and pressure of the incoming fuel and air, the temperature and pressure of the combustion gases, and the emissions levels in the combustion gases. For example, the emissions may include nitrogen oxides (NOx), sulfur oxides (SOx), carbon dioxide ($CO_2$), carbon monoxide (CO), and particulate matter, among other things. Similarly, the sensors 46 in the turbine section 20 may monitor the temperature, pressure, and emissions levels in the hot combustion gases, vibration in the turbine section 20, clearance between rotating and stationary parts, and power output by the turbine section 20. The sensors 46 coupled to the generator 24 may monitor electrical output, temperature of the generator 24, grid stability of the power grid, and other parameters associated with operation of the generator 24. It should be noted that the positions of the sensors 46 illustrated in FIG. 1 are meant to be exemplary and non-limiting. That is, the sensors 46 may be disposed in one or more of the positions shown as well as any other position within the gas turbine system 10. The temperature control system 11 may be configured to adjust the temperature of the intake air based on sensor input from any of the sensors 46.

Figure 2:
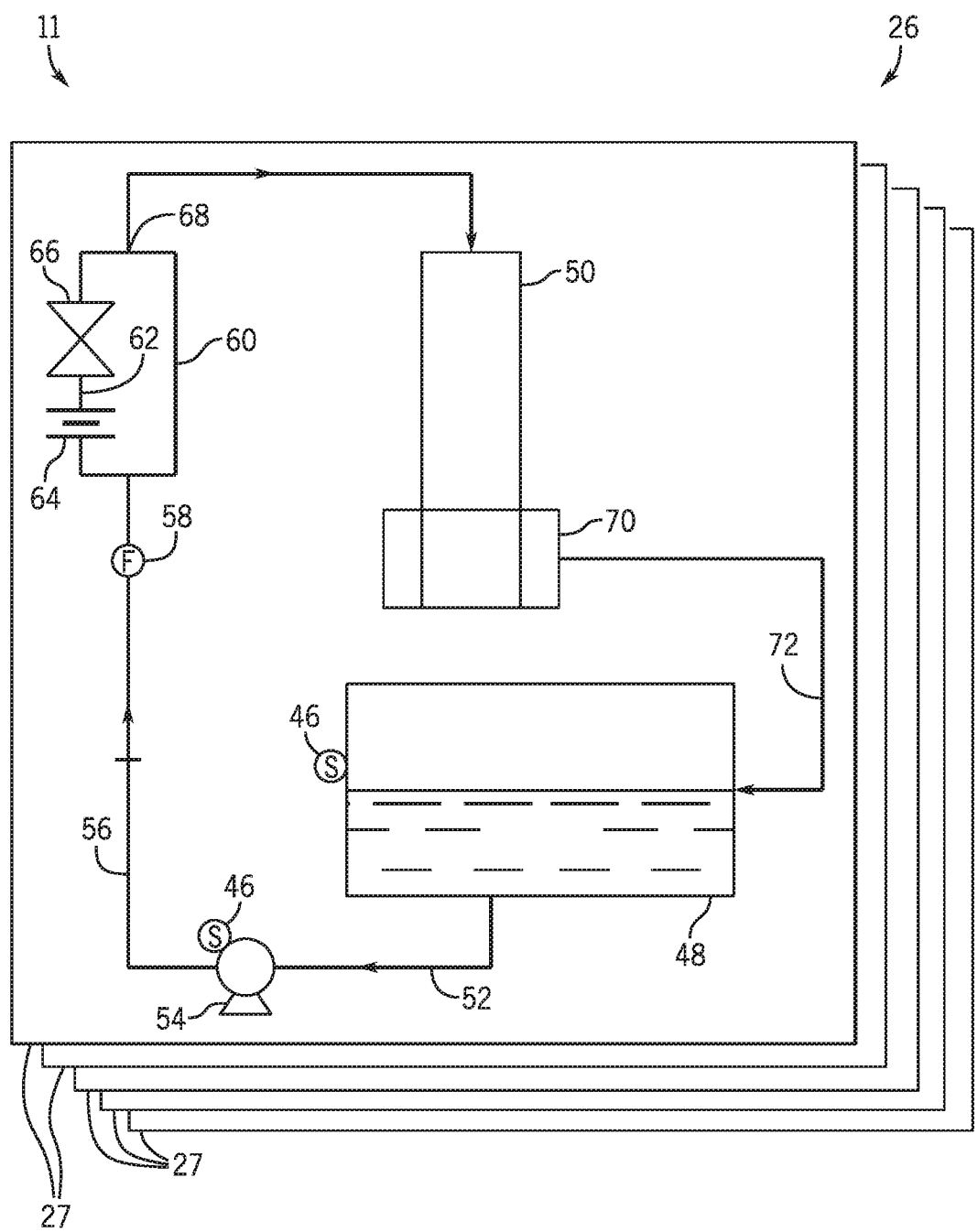
FIG. 2 is a diagram of an embodiment of the evaporative cooling system of the gas turbine system of FIG. 1.

FIG. 2 is a diagram of an embodiment of the evaporative cooling system 26 having a plurality of evaporative coolers 27. In certain embodiments, the temperature control system 11 may selectively enable or disable one or more of the plurality of evaporative coolers 27 to vary a cooling capacity of the evaporative cooling system 26. In the illustrated embodiment, each evaporative cooler 27 of the evaporative cooling system 26 includes a fluid tank 48 for storing a cooling fluid (e.g., water) and an evaporative cooling medium 50 for placing the cooling fluid in a heat exchange relationship with the air received by the air intake section 14.

In operation, the cooling fluid exits the fluid tank 48 via a pump intake line 52, which supplies the cooling fluid to a pump 54. The cooling fluid exits the pump 54 via supply line 56 where the cooling fluid flows through a flowmeter 58. As shown in the illustrated embodiment, a primary line 60 and a secondary line 62 in a parallel relationship with the primary line 60 are disposed downstream of the flowmeter 58. The secondary line 62 includes an orifice plate 64 that may regulate the flow of the cooling fluid flowing from the supply line 56. Additionally, the secondary line 62 may include one or more additional valves 66 (e.g., a trim valve). As shown, the secondary line 62 joins the primary line 60 at the union 68. However, in other embodiments, the evaporative cooling system 26 may not include the secondary line 62, the flowmeter 58, and the orifice plate 64. In any case, the flow of cooling fluid from the pump 54 may flow into the evaporative cooling medium 50 where the cooling fluid is absorbed by the evaporative cooling medium 50, and thus the evaporative cooling medium 50 becomes wetted, as discussed above. In some embodiments, a collector pan 70 may be positioned downstream of the evaporative cooling medium 50. The collector pan 70 may collect any residual cooling fluid flowing from the evaporative cooling medium 50 and provide the flow of cooling fluid to a drain line 72, which feeds back into the fluid tank 48.

In certain embodiments, each evaporative cooler 27 of the evaporative cooling system 26 may include a plurality of evaporative cooling mediums 50 with each evaporative cooling medium 50 having one or more supply lines 56 that are each configured to provide a cooling fluid from one or more fluid tanks 48. The evaporative cooling mediums 50 may be arranged in series or in parallel. The evaporative cooling mediums 50 facilitate evaporative cooling to help cool the intake air 9 in the intake section 14. For example, each evaporative cooler 27 of the evaporative cooling system 26 may include two, three, four, five, or more of the supply lines 56 and evaporative cooling mediums 50. It should be noted that such an embodiment may enable the gas turbine system 10 to operate at a desired power output under a broader range of operating temperatures, such as extreme high and low temperatures. For example, the evaporative cooling system 26 may be configured to selectively enable or disable one or more of the evaporative coolers 27 and/or one or more of the evaporative cooling mediums 50 in each of the evaporative coolers 27.

It should be noted that, in certain embodiments, a controller (e.g., controller 36 as discussed above with respect to FIG. 1) may function to control operation of the pump 54 and/or flowmeter 58. Moreover, at least in some instances, the controller 36 may receive measurements from one or more sensors 46 that may provide an indication of operation of the evaporative cooling system 26, such as whether the pump 54 is operating and/or a cooling fluid level in the fluid tank 48. Additionally, the controller 36 may receive a flow rate measurement by the flowmeter 58. In any case, as discussed in more detail with respect to FIG. 4, the controller 36 may use these measurements to control operation of both the cooling system 13, 26 and the variable heating system 12.

Figure 3:
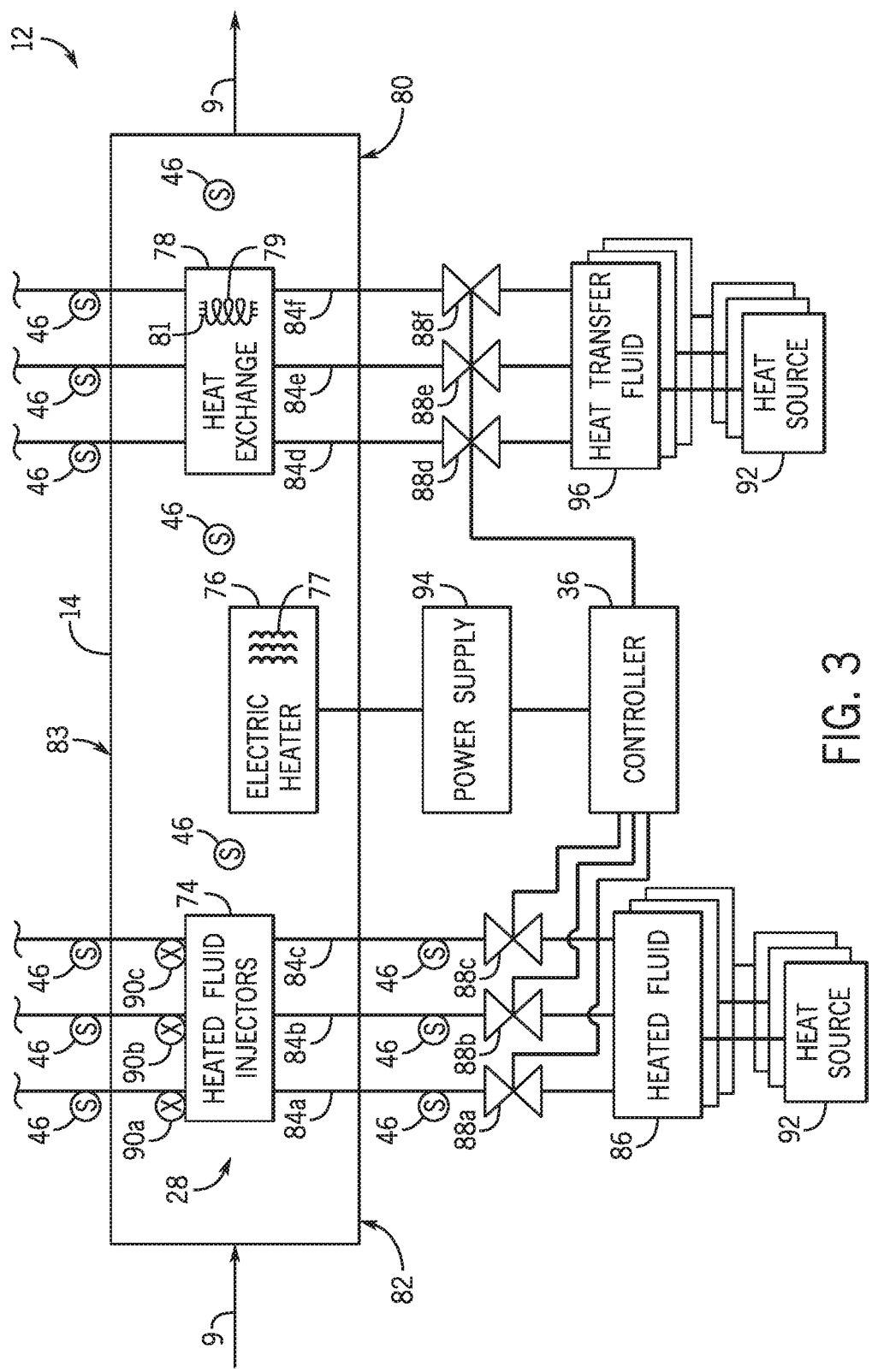
FIG. 3 is a diagram of an embodiment of the variable heating system of the gas turbine of FIG. 1.

FIG. 3 is a diagram of an embodiment of the variable heating system 12 of the temperature control system 11 of FIG. 1, further illustrating various heaters 28 configured to heat the air 9 received by the air intake section 14. For example, the heaters 28 may include a heated fluid injector 74, an electric heater 76, and a heat exchanger 78. While only one heated fluid injector 74, one electric heater 76, and one heat exchanger 78 are shown, certain embodiments of the variable heating system 12 may include any number (e.g., 1, 2, 3, 4, 5, or more) of the heated fluid injector 74, the electric heater 76, and/or the heat exchanger 78 at one or more of the axial positions 30, 32, and/or 34 within the air intake section 14 as illustrated in FIG. 1.

In certain embodiments, a plurality of the same or different heaters 28 (e.g., the heated fluid injector 74, the electric heater 76, and/or the heat exchanger 78) may be arranged in series and/or in parallel with one another relative to a direction of the airflow through the air intake section 14. If the variable heating system 12 includes different heaters 28 (e.g., 74, 76, and/or 78) arranged in series as shown in FIG. 3, then the different heaters 28 may be arranged in any order. In certain embodiments, any of the heaters 28 (e.g., 74, 76, and/or 78) may be positioned in a first, second, third, fourth, fifth, or subsequent position in a sequence of heaters 28, and any of the heaters 28 (74, 76, and/or 78) may be positioned in the axial positions 30, 32, and/or 34 shown in FIG. 1. For example, each of the heaters 28 (e.g., 74, 76, and/or 78) may be proximate to a downstream portion 80 of the air intake section 14, an upstream portion 82 of the air intake section 14, or an intermediate portion 83 of the air intake section 14 between the downstream portion 80 and the upstream portion 82.

It should be noted that the relative position of the one or more heaters 28 (e.g., 74, 76, and/or 78) with respect to the evaporative cooling system 26 may provide certain advantages. For example, when one or more heaters 28 are disposed proximate to the upstream portion 82 (e.g., at axial position 30, which is upstream of the evaporative cooling system 26 as shown in FIG. 1), the variable heating system 12 may enable the IGVs 22 to maintain a position for a desired power output. However, the additional heat (e.g., elevated temperature of the airflow 9, thus decreasing the relative humidity) may increase the water consumption of the evaporative cooling system 26, potentially reducing efficiency, reducing performance, and/or increasing costs. When one or more heaters 28 are disposed proximate to the downstream portion 80 (e.g., at axial position 34, which is downstream of the evaporative cooling system 26 as shown in FIG. 1), the variable heating system 12 may also enable the IGVs 22 to maintain the position for the desired power output. However, the additional heat (e.g., elevated temperature of the airflow 9) would not increase the water consumption of the evaporative cooling system 26, because the heat would be added after cooling the airflow 9 by the evaporative cooling system 26.

The heated fluid injector 74 includes circuits 84 that may each be selectively coupled to a flow path of the heated fluid 86 (e.g., air, exhaust gas, inert gases such as nitrogen, water such as steam, or any combination thereof) via corresponding valves 88. In certain embodiments, the heated fluid 86 may include a source of waste heat to improve the efficiency of a plant, e.g., a power plant. The waste heat may include, for example, the exhaust gas from the turbine section 20, a furnace, a boiler, or another combustion system. The heated fluid injector 74 may include one or more fluid nozzles coupled to a wall of the air intake section 14, a grid of perforated fluid conduits in the air intake section 14, a grid of fluid conduits having fluid nozzles in the air intake section 14, or any combination thereof. As used herein, each flow path includes a conduit directing the heated fluid between components of the variable heating system 12 along a predetermined route.

Additionally, the heated fluid injector 74 includes heated fluid outlets 90 that may provide the heated fluid 86 to the air intake section 14 to mix with the air from the ambient environment to heat the air from the ambient environment. Thus, by injecting the heated fluid 86 directly into the airflow 9, the heated fluid injector 74 may be considered a direct heating unit. In certain embodiments, the variable heating system 12 may include multiple heated fluid injectors 74 that each include two or more of the circuits 84, each of which is configured to inject a heated fluid 86 into the air intake section 14 to exchange heat between the airflow 9 received by the air intake section 14 from the ambient environment and the heated fluid 86. For example, the heated fluid injectors 74 may include two, three, four, five, or more of the circuits 84 (circuits 84a, 84b, and 84c being illustrated in FIG. 3).

In some embodiments, the heated fluid 86 may be thermally coupled to a heat source 92 (e.g., electrical heater, a combustion system such as a furnace, and the like) that is configured to raise a temperature of the heated fluid 86 in response to control signals received by the controller 36. For example, the controller 36 may receive feedback indicative of an ambient temperature of the air in the ambient environment via a sensor 46 and adjust (e.g., increase or decrease) a current output by the heat source 92 based on the feedback to adjust the temperature of the heated fluid 86. In other embodiments, the heat source 92 may continuously heat and/or maintain a temperature of the heated fluid 86 at a predetermined temperature. While only one heated fluid injector 74 is shown, it should be noted that, at least in some embodiments, the variable heating system 12 may include multiple heated fluid injectors 74 that are disposed in series, in parallel, or both.

During operation, the variable heating system 12 (e.g., the controller 36) selectively couples one or more of the circuits 84a, 84b, and 84c to the heated fluid injector 74 via the valves 88a, 88b, and 88c based on an operating parameter of the gas turbine system 10, such as an ambient temperature, a relative humidity, a compressor inlet temperature, a plant output load, a gas turbine exhaust temperature, a compressor discharge temperature, a combustor firing temperature, a steam temperature, a steam flow, or any combination thereof. For instance, the controller 36 may receive feedback indicative of the temperature of the airflow 9 via a sensor 46 and selectively adjust (e.g., open, partially open, partially close, or completely close) a position of the valves 88a, 88b, and/or 88c based on the feedback. In certain embodiments, a single valve may couple two or more of the circuits 84a, 84b, and 84c, and, therefore, adjusting a position of a valve 88 may enable the heated fluid 86 to flow through multiple circuits 84. In any case, when one or more of the circuits 84a, 84b, and 84c are fluidly coupled to the heated fluid 86 via the valves 88a, 88b, and 88c, the circuits 84a, 84b, and 84c may provide a flow of at least a portion of the heated fluid 86 to the air intake section 14 via the heated fluid outlets 90a, 90b, and 90c.

The electric heater 76 (e.g., heating coil) is electrically coupled to a power supply 94. During operation, the power supply 94 may provide an electric current to a heating element 77 of the electric heater 76 (e.g., a resistor). The heating element 77 converts the electric current into heat to raise a temperature of the airflow 9 within the air intake section 14. While only one heated electric heater 76 is shown, it should be noted that, at least in some embodiments, the variable heating system 12 may include multiple electric heaters 76 that are disposed in series, in parallel, or both.

The heat exchanger 78 includes circuits 84 that may each be selectively coupled to a flow path of the heat transfer fluid 96. The heat exchanger 78 may include a shell and tube heat exchanger, a plate and shell heat exchanger, a plate fin heat exchanger, a helical coil heat exchanger, or any suitable heat exchanger for the air intake section 14. For example, the heat exchanger may include one or more tubes 79 having fins 81, wherein the heat transfer fluid 96 passes through the tubes 79, and the airflow 9 passes around the tubes 79 along the fins 81, thereby indirectly transferring heat from the heat transfer fluid 96 to the airflow 9.

In certain embodiments, the variable heating system 12 may include multiple heat exchangers 78, each of which includes two or more of the circuits 84 that are each configured to exchange heat between a heat transfer fluid 96 in the respective circuit, and the airflow 9 passing through or over the circuits 84. For example, the heat exchangers 78 may include two, three, four, five, or more of the circuits 84. As shown, the heat exchanger 78 includes three circuits 84d, 84e, and 84f that are each coupled to a respective valve 88d, 88e, and 88f. The heat exchanger 78, one or more circuits 84, and respective valves 88 are collectively referred to as a heat exchanger system that is part of the variable heating system 12. Additionally, each of the circuits 84 shown in FIG. 4 are single-pass circuits, although, in other embodiments, one or more of the circuits 84 may be dual-pass or multi-pass circuits. While only one heat exchanger 78 is shown, it should be noted that, at least in some embodiments, the variable heating system 12 may include multiple heat exchangers 78 that are disposed in series, in parallel or both.

During operation, the variable heating system 12 (e.g., the controller 36) selectively couples one or more of the circuits 84d, 84e, and 84f to the heat exchanger 78 via the valves 88d, 88e, and 88f based on an operating parameter of the gas turbine system 10, such as an ambient temperature, a relative humidity, a compressor inlet temperature, a plant output load, a gas turbine exhaust temperature, a compressor discharge temperature, a combustor firing temperature, a steam temperature, a steam flow, or any combination thereof. For instance, the controller 36 may receive feedback indicative of the temperature of the airflow 9 via a sensor 46 and may selectively adjust a position of the valves 88d, 88e, and/or 88f based on the feedback. In certain embodiments, at least one of the circuits 84d, 84e, and 84f may not include a valve 88, and, therefore, is an uninterrupted connection that enables the heating fluid to continuously flow through the at least one circuit 84d, 84e, and 84f of the heat exchanger 78 during operating of the variable heating system 12. In other embodiments, each of the circuits 84 includes a corresponding valve 88. In still further embodiments, a single valve 88 may fluidly couple multiple circuits 84 to the heat exchanger 78.

FIG. 4 is a flow chart illustrating an embodiment of a process 98 for operating the temperature control system 11, including the variable heating system 12 and the cooling system 13, 26, as discussed above with reference to FIGS. 1-3. It is to be understood that the steps discussed herein are merely exemplary, and certain steps may be omitted or performed in a different order that the order described below. In some embodiments, the process 98 may be stored in the memory 40 and/or storage 42 and executed by the processor 38 of the controller 36, or stored in other suitable memory and executed by other suitable processing circuitry associated with the gas turbine system 10 or separate, suitable processing circuitry.

As shown in the illustrated embodiment of FIG. 4, at block 100, the processor 38 receives feedback indicative of an operating parameter of the gas turbine system 10. In the illustrated embodiment, the operating parameter may include a temperature of ambient air or intake air into the air intake section 14 and/or into the compressor section 16. For example, the air temperature may be measured at, upstream of, or downstream from the cooling system 13, 26 and/or the IGVs 22. Alternatively, or additionally, the operating parameter may include a surface temperature and/or component temperature of the cooling system 13, 26 and/or the IGVs 22. The temperature feedback noted above may be used to help control the temperature of the intake air for purposes of power augmentation. In certain embodiments, the operating parameters also may include ambient conditions (e.g., relative humidity, ambient temperature, etc.), operating parameters of the gas turbine system 10 (e.g., a position of the inlet guide vanes 22, a discharge temperature or pressure from the compressor section 16, a fuel/air ratio in the combustion section 18, a flame temperature, fuel efficiency or usage, exhaust emissions levels, power output by the gas turbine system 10, a load on the gas turbine system 10, etc.) and/or operating conditions of other related systems, such as a steam turbine in a combined cycle power plant (e.g., a steam temperature, a steam pressure, a steam flow, etc.). In general, the operating parameter may be any parameter that indicates a need to adjust the temperature of the intake air into the air intake section 14 of the gas turbine system 10.

In some embodiments, prior to or during block 100, the processor 38 may receive input indicative of a desired power output of the gas turbine system. For example, the processor 38 may receive a feedback indicative of an ambient temperature and/or a relative humidity of the ambient environment, a temperature threshold, and/or humidity threshold. Then, the processor 38 may determine a current power output based on the feedback. For example, the memory 40 and/or storage 42 may store a lookup table and/or lookup plot that includes power outputs based on ambient temperature and/or humidity associated with the ambient environment and/or the components of the gas turbine system 10. In such embodiments, the processor 38 may determine whether a current power output of the gas turbine system is above or below the desired power output of the gas turbine system, as generally discussed with respect to block 102.

In some embodiments, the lookup table and/or lookup plot may enable the processor 38 to determine the current power output of the gas turbine system 10 when the evaporative cooling system 26 is active. It should be noted that certain evaporation cooling systems may not have a part-load operating point, and, therefore, while it may be advantageous to cool the ambient air using the evaporative cooling system 26 (e.g., for power augmentation), the evaporative cooling system 26 may overcool the air.

When the feedback indicative of the operating parameter is received by the processor 38, the processor 38 may compare the feedback to a threshold range, as indicated in block 102. The threshold range may be determined by an operator during manufacturing of the variable heating system 12. Additionally, or alternatively, the threshold may be determined through experimental testing and stored within the memory 40 of the controller 36. Further, the threshold range may be a threshold value. That is, the processor 38 may determine whether the feedback is greater than or less than the threshold value, rather than within a threshold range. As several non-limiting examples, the threshold value or threshold range may be a threshold position of the IGVs (e.g., a maximum or minimum position), a temperature threshold, a humidity threshold, a power output (MW) threshold, and the like. In general, the threshold may be any threshold range or threshold value that is associated with the performance and/or capacity of the gas turbine system 10, the ambient environment, or both.

In certain embodiments, the processor 38 may compare the feedback, such as a current power output, to a desired power output or a desired power output range. In the illustrated embodiment, the processor 38 may compare the feedback (e.g., temperature of ambient air, airflow 9, and/or temperature at the cooling system 13, 26 or IGVs 22) to a temperature threshold. For example, the temperature threshold may correspond to a temperature at which the gas turbine system 10 may achieve a desired power output. In certain embodiments, the process 98 may evaluate the feedback (e.g., measured temperature) against multiple temperature thresholds, which may correspond to different locations and/or components (e.g., ambient air, temperature at the cooling system 12, 26, and temperature at the IGVs 22). The process 98 also may evaluate the feedback (e.g., measured temperature) against multiple temperature thresholds, each of which may trigger a different control action depending on the severity of the temperature.

At block 104, the processor 38 of the controller 36 provides a suitable control signal to the cooling system 13 (e.g., evaporative cooling system 26) depending on the cooling needs in the gas turbine system 10. For example, the processor 38 of the controller 36 may selectively control the evaporative cooling system 26 to operate (i.e., "on" condition) when needed for power augmentation, or shut off (i.e., "off" condition) when not needed for power augmentation. However, in the illustrated embodiment, the processor 38 of the controller 36 may be configured to control the evaporative cooling system 26 to operate continuously under normal conditions, because the variable heating system 12 may be used to adjust the temperature of the airflow 9 being cooled by the evaporative cooling system 26.

At block 106, the processor 38 of the controller 36 provides a suitable control signal to the variable heating system 12 to adjust the temperature of intake air, with or without cooling by the cooling system 13, 26. For example, in embodiments with the cooling system 13 (e.g., evaporative cooling system 26) operating continuously during operation of the gas turbine system 10, the variable heating system 12 may be controlled to adjust the temperature of the intake air being cooled by the cooling system 13, e.g., to increase the temperature of the intake air if the temperature falls below one or more temperature thresholds as discussed above. Accordingly, the processor 38 of the controller 36 controls the variable heating system 12 by adjusting the heaters 28, such as by sending control signals to the valve(s) 88 (e.g., as described above with respect to FIG. 3) of the heated fluid injector 74 and/or the heat exchanger 78. Alternatively, or additionally, the processor 38 provides a suitable control signal to the power supply 94 that is electrically coupled to the electric heater 76 thereby generating heat within the air intake section 14. In some embodiments, the controller 36 may provide a suitable signal to a pump coupled to one of the circuits 84 to control a flow rate of a heated fluid 86 or a heat transfer fluid 96 based on the feedback.

In some embodiments, the processor 38 may provide the suitable control signal to the variable heating system 12 based desired power output of the gas turbine system 10. That is, the processor 38 may determine an amount of heating to supply using the variable heating system 12 to produce the desired power output based on the feedback and/or a lookup table or plot stored in the memory 40 and/or storage 42. At least in some instances, the processor 38 may determine the amount of heating to supply based on an evaporative cooling system 26 being present and/or operating. In this way, the disclosed variable heating system 12 may enable gas turbine systems 10 to operate more efficiently, even when implementing certain evaporative cooling systems 26 that may overcool the air, by supplying heat to the airflow 9 to modify the temperature of the airflow 9 to an amount that is associated with a desired power output.

Technical effects of the present system and method include improving the performance of a gas turbine system by enabling continuous operation of a cooling system 13 (e.g., evaporative cooling system 26) in an air intake section 14 to help increase efficiency and/or power output of the gas turbine system 10, while adjusting the temperature of the intake air via a variable heating system 12 to achieve a target temperature. The target temperature of the intake air may be the lowest temperature possible based on a lower temperature threshold, or the target temperature may fall within a temperature range having an upper temperature threshold and a lower temperature threshold. The target temperature may be selected to achieve a desired power output of the gas turbine system. The target temperature also may be selected to enable the IGVs 22 to remain in a desired position (e.g., open position), which may not otherwise be possible if the cooling system 13 overcools the intake air.

In certain embodiments, the variable heating system 12 may be retrofitted to a gas turbine system 10 having an evaporative cooling system 26, or the variable heating system 12 and the cooling system 13 (e.g., evaporative cooling system 26) may be collectively installed in a new gas turbine system 10. In either case, the variable heating system 12 may adjust (e.g., increase or decrease) a temperature of air cooled by the evaporative cooling system 26 before the air is compressed in the compressor section 16.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a controller programmed with instructions to control a temperature control system configured to couple to an air intake section of a gas turbine system, wherein the temperature control system comprises an evaporative cooling system and a variable heating system, wherein the instructions comprise:
   instructions to control the evaporative cooling system to cool an airflow in the air intake section in an operational mode of the evaporative cooling system;
   instructions to control the variable heating system having one or more heaters to heat the airflow in the air intake section during the operational mode,. while the evaporative cooling system cools the airflow, to avoid or reduce closing of inlet guide vanes of a compressor of the gas turbine system, such that the variable heating system heats the airflow to offset the cooling by the evaporative cooling system to avoid complete or partial closing of the inlet guide vanes; and
   wherein the instructions to control the variable heating system vary an amount of heat supplied by the one or more heaters based on at least one temperature measurement relative to a temperature threshold.

2. The system of claim 1, comprising the evaporative cooling system having one or more evaporative cooling media configured to receive and evaporate a cooling liquid.

3. The system of claim 2, wherein the evaporative cooling system is configured to cool the airflow to increase a power output by the gas turbine system.

4. The system of claim 1, comprising the variable heating system having the one or more heaters.

5. The system of claim 4, wherein the one or more heaters comprise at least one of a fluid injector, an electric heater, or a heat exchanger.

6. The system of claim 1, comprising the variable heating system having the one or more heaters and the evaporative cooling system, wherein the one or more heaters are configured to be disposed at an upstream position relative to the evaporative cooling system, at a downstream position relative to the evaporative cooling system, or at a common position or integrated with the evaporative cooling system.

7. A method, comprising:
   controlling a temperature control system to adjust a temperature of an airflow in an air intake section of a gas turbine system, the temperature control system comprising a controller programmed with instructions to control the temperature control system configured to couple to the air intake section of the gas turbine system, wherein the temperature control system comprises an evaporative cooling system and a variable heating system, wherein the instructions comprise:
   instructions to control the evaporative cooling system to cool the airflow in the air intake section in an operational mode of the evaporative cooling system;
   instructions to control the variable heating system having one or more heaters to heat the airflow in the air intake section during the operational mode, while the evaporative cooling system cools the airflow, to avoid or reduce closing of inlet guide vanes of a compressor of the gas turbine system, such that the variable heating system heats the airflow to offset the cooling by the evaporative cooling system to avoid complete or partial closing of the inlet guide vanes; and
   wherein the instructions to control the variable heating system vary an amount of heat supplied by the one or more heaters based on at least one temperature measurement relative to a temperature threshold;
   controlling, via the controller programmed with the instructions, the evaporative cooling system to cool the airflow in the air intake section in the operational mode of the evaporative cooling system; and
   controlling, via the controller programmed with the instructions, the variable heating system having the one or more heaters to heat the airflow in the air intake section during the operational mode, while the evaporative cooling system cools the airflow in the air intake section, to avoid or reduce closing of the inlet guide vanes of the compressor of the gas turbine system, such that the variable heating system heats the airflow to offset the cooling by the evaporative cooling system to avoid complete or partial closing of the inlet guide vanes, and wherein controlling the variable heating system comprises varying an amount of heat supplied by the one or more heaters based on at least one temperature measurement relative to a temperature threshold, measured within the air intake section.

8. The method of claim 7, wherein controlling the evaporative cooling system comprises cooling the airflow to increase a power output by the gas turbine system.

9. The method of claim 7, wherein controlling the variable heating system comprises heating the airflow after the airflow is cooled by the evaporative cooling system.

10. The method of claim 7, wherein controlling the variable heating system comprises varying the amount of heat based on at least one relative humidity measurement relative to a humidity threshold.

11. A system, comprising:
   a temperature control system configured to couple to an air intake section of a gas turbine system, wherein the temperature control system comprises:
   an evaporative cooling system configured to cool an airflow in the air intake section;

a variable heating system having one or more heaters configured to heat the airflow in the air intake section; and a controller programmed with instructions to control the evaporative cooling system to cool the airflow in an operational mode while controlling the variable heating system to vary an amount of heat supplied by the one or more heaters to heat the airflow during the operational mode, while the evaporative cooling system cools the airflow, to avoid or reduce closing of inlet guide vanes of a compressor of the gas turbine system, such that the variable heating system heats the airflow to offset the cooling by the evaporative cooling system to avoid complete or partial closing of the inlet guide vanes based on at least one temperature measurement relative to a temperature threshold.

12. The system of claim 11, wherein the evaporative cooling system comprises one or more evaporative cooling media configured to receive and evaporate a cooling liquid.

13. The system of claim 11, wherein the one or more heaters comprise a plurality of heaters disposed in series relative to one another, in parallel relative to one another, or a combination thereof.

14. The system of claim 11, wherein the one or more heaters are disposed at an upstream position relative to the evaporative cooling system, at a downstream position relative to the evaporative cooling system, or at a common position or integrated with the evaporative cooling system.

15. The system of claim 11, wherein the one or more heaters comprise at least one of a fluid injector, an electric heater, or a heat exchanger.

16. The system of claim 11, wherein the evaporative cooling system is configured to cool the airflow to increase a power output by the gas turbine system.

17. The system of claim 11, comprising the air intake section having the temperature control system.

18. The system of claim 17, comprising the gas turbine system having the air intake section.

* * * * *